(12) United States Patent
Retsch (10) Patent No.: US 11,221,069 B2
(45) Date of Patent: Jan. 11, 2022

(54) SHIFTING MECHANISM FOR A TRANSMISSION

(71) Applicant: ZF Friedrichshafen AG, Friedrichshafen (DE)

(72) Inventor: Matthias Retsch, Brandenburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 530 days.

(21) Appl. No.: 16/128,960

(22) Filed: Sep. 12, 2018

(65) Prior Publication Data

US 2019/0078686 A1 Mar. 14, 2019

(30) Foreign Application Priority Data

Sep. 14, 2017 (DE) ...................... 10 2017 216 322.4

(51) Int. Cl.
*F16H 63/00* (2006.01)
*F16H 63/30* (2006.01)
(Continued)

(52) U.S. Cl.
CPC ........... *F16H 63/304* (2013.01); *F16D 23/04* (2013.01); *F16H 63/30* (2013.01); *F16H 3/006* (2013.01); *F16H 2003/0807* (2013.01); *F16H 2003/0931* (2013.01); *F16H 2063/3093* (2013.01)

(58) Field of Classification Search
CPC ........ F16H 63/304; F16H 63/30; F16H 3/006; F16H 2063/3093; F16H 2003/0931;
(Continued)

(56) References Cited

U.S. PATENT DOCUMENTS 2,333,165 A * 11/1943 Fishburn ................. F16D 23/06
192/53.31
3,365,039 A * 1/1968 Stott ................... F16D 23/0606
192/53.331
(Continued)

FOREIGN PATENT DOCUMENTS

DE 102008000647 A1 6/2009
DE 102008000647 A1 9/2009
(Continued)

OTHER PUBLICATIONS

European Search Report EP 17 19 1109, dated Feb. 28, 2018 (2 pages).
Chinese Office Action 201810893551.3, dated Jan. 27, 2021 (1 page).

*Primary Examiner* — Victor L MacArthur
(74) *Attorney, Agent, or Firm* — Dority & Manning, P.A.

(57) ABSTRACT

An engagement device (1) for a transmission (G), the engagement device (1) including a gear shift sleeve (S) arranged between a first idler gear (LR1) associated with a shaft (W) of the transmission (G) and a second idler gear (LR2) arranged coaxially to the shaft (W). By displacing the gear shift sleeve (S) towards the first idler gear (LR1), a rotationally fixed connection between the shaft (W) and the first idler gear (LR1) can be established. By displacing the gear shift sleeve (S) towards the second idler gear (LR2), a rotationally fixed connection between the first idler gear (LR1) and the second idler gear (LR2) can be established. The first idler gear (LR1) includes a plurality of axially projecting extensions (F) which extend through openings (A) formed in the gear shift sleeve (S).

16 Claims, 13 Drawing Sheets

(51) Int. Cl.
  *F16D 23/04*   (2006.01)
  *F16H 3/00*   (2006.01)
  *F16H 3/093*   (2006.01)
  *F16H 3/08*   (2006.01)

(58) Field of Classification Search
  CPC .. F16H 2003/0807; F16H 63/02; F16D 23/04; F16D 23/06; F16D 2023/0618; F16D 21/04
  See application file for complete search history.

(56) References Cited

U.S. PATENT DOCUMENTS

| | | | |
|---|---|---|---|
| 4,138,007 A * | 2/1979 | Wakabayashi | F16D 23/0606 192/53.33 |
| 8,418,826 B2 * | 4/2013 | Li | F16D 23/0606 192/53.331 |
| 2006/0185958 A1 | 8/2006 | Bader | |
| 2012/0240701 A1 | 9/2012 | Matsuda et al. | |
| 2014/0209426 A1 | 7/2014 | Mori et al. | |
| 2017/0051811 A1 * | 2/2017 | Takeuchi | F16H 63/30 |

FOREIGN PATENT DOCUMENTS

| | | |
|---|---|---|
| DE | 102013106846 A1 | 7/2014 |
| DE | 102013108736 A1 | 2/2015 |
| EP | 2762757 A2 | 8/2014 |

* cited by examiner

SHIFTING MECHANISM FOR A TRANSMISSION

FIELD OF THE INVENTION

The invention relates generally to an shifting device for a transmission, in particular for a motor vehicle transmission. The invention further relates to a transmission including such a shifting device.

BACKGROUND

DE 10 2008 000 647 A1, which belongs to the applicant, describes an arrangement for connecting at least one idler gear to an associated shaft of a transmission. By the engagement or shifting device disclosed therein, the idler gear can be coupled either to the associated shaft or to yet another idler gear. One of the exemplary embodiments shows an engagement device including a synchronizer, wherein a gear shift sleeve of the engagement device is connected to the idler gear via driving elements. The driving elements are rotationally fixed to the gear shift sleeve and engage in a form-fit or positively locking manner into corresponding openings in the idler gear.

An embodiment of this type is disadvantageous for the production of the gear shift sleeve, however, since a greater amount of effort is required to manufacture an internal tooth system of the gear shift sleeve, due to the driving elements.

SUMMARY OF THE INVENTION

An engagement device for a transmission is provided, which is configured for establishing two engageable, rotationally fixed connections, namely between a shaft of the transmission and a first idler gear associated with the shaft, and between the first idler gear and a second idler gear. The second idler gear is arranged coaxially to the same shaft.

For this purpose, the engagement device includes a gear shift sleeve arranged between the first and the second idler gears. By displacing the gear shift sleeve in the direction or towards of the first idler gear, the rotationally fixed connection between the shaft and the first idler gear is established, for example, via a dog toothing. By displacing the gear shift sleeve in the direction of or towards the second idler gear, the rotationally fixed connection between the first idler gear and the second idler gear is established.

According to the invention, the first idler gear includes a plurality of axially projecting extensions which extend through openings formed in the gear shift sleeve. As a result, the gear shift sleeve and the first idler gear are connected in a form-fit manner in the direction of rotation. The axially projecting extensions do not impede the production of the external gearing of the idler gear.

The openings are preferably through holes or open areas. A through hole, unlike an open area, has a closed cross-section. Through these two embodiments, a positive engagement can be formed between the gear shift sleeve and the first idler gear.

Preferably, the extensions have a circular cross-section. In other words, the extensions are cylinders, solid cylinders, or hollow cylinders. Alternatively thereto, the extensions can be ring segments axially projecting from the first idler gear.

According to one preferred embodiment, the extensions and the first idler gear are one part. In other words, the extensions and the first idler gear are machined from one common raw part, and therefore the extensions and the first idler gear do not need to be joined. As a result, a particularly compact design is possible, since joints can be omitted. Alternatively thereto, a multiple-part design can be selected, and therefore the extensions are connected to the first idler gear, for example, via a press-fit or frictional connection or a welded joint. Depending on the version, such a multiple-part design can reduce manufacturing effort.

Preferably, the engagement device has a neutral position, in which a rotationally fixed connection exists neither between the shaft and the first idler gear nor between the two idler gears. This is advantageous, in particular, for the application in a motor vehicle transmission having multiple gears.

Preferably, a synchronizing mechanism is associated with at least one of the idler gears. Through the synchronizing mechanism, the respective rotationally fixed connection is established only at the synchronous speed of the components involved. Alternatively thereto, at least one of the engageable, rotationally fixed connections can be established via an unsynchronized dog toothing.

According to one preferred embodiment, the engagement device includes a pressure piece holder. The pressure piece holder is configured for supporting a spring-loaded pressure piece, for example, a ball. Through the pressure piece, the gear shift sleeve can be locked in at least one axial position by the pressure piece engaging into an appropriate recess in the gear shift sleeve. The pressure piece holder can be centered on an inner side of the extensions. For this purpose, the pressure piece holder is preferably rotationally fixed to the gear shift sleeve. Alternatively to the centering on the inner side of the extensions, the pressure piece holder can be centered on the first or the second idler gear via a bearing, preferably via a bearing. According to yet another possible alternative, the pressure piece holder can be centered on the shaft.

The engagement device according to the invention can be an integral part of a transmission for a motor vehicle transmission. In this case, a transmission means, in particular, a multi-stage transmission, in which a multitude of gears, i.e., fixed translation ratios between an input shaft and an output shaft of the transmission are shiftable. The engagement device is preferably utilized for establishing two such gears. Since two idler gears can be coupled to each other in a rotationally fixed manner by the engagement device, the engagement device is particularly suitable for establishing a winding path gear.

BRIEF DESCRIPTION OF THE DRAWINGS

Exemplary embodiments of the invention are described in detail in the following with reference to the attached figures. Components that are the same or similar are labeled using the same reference characters. In the drawings, the following is shown.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
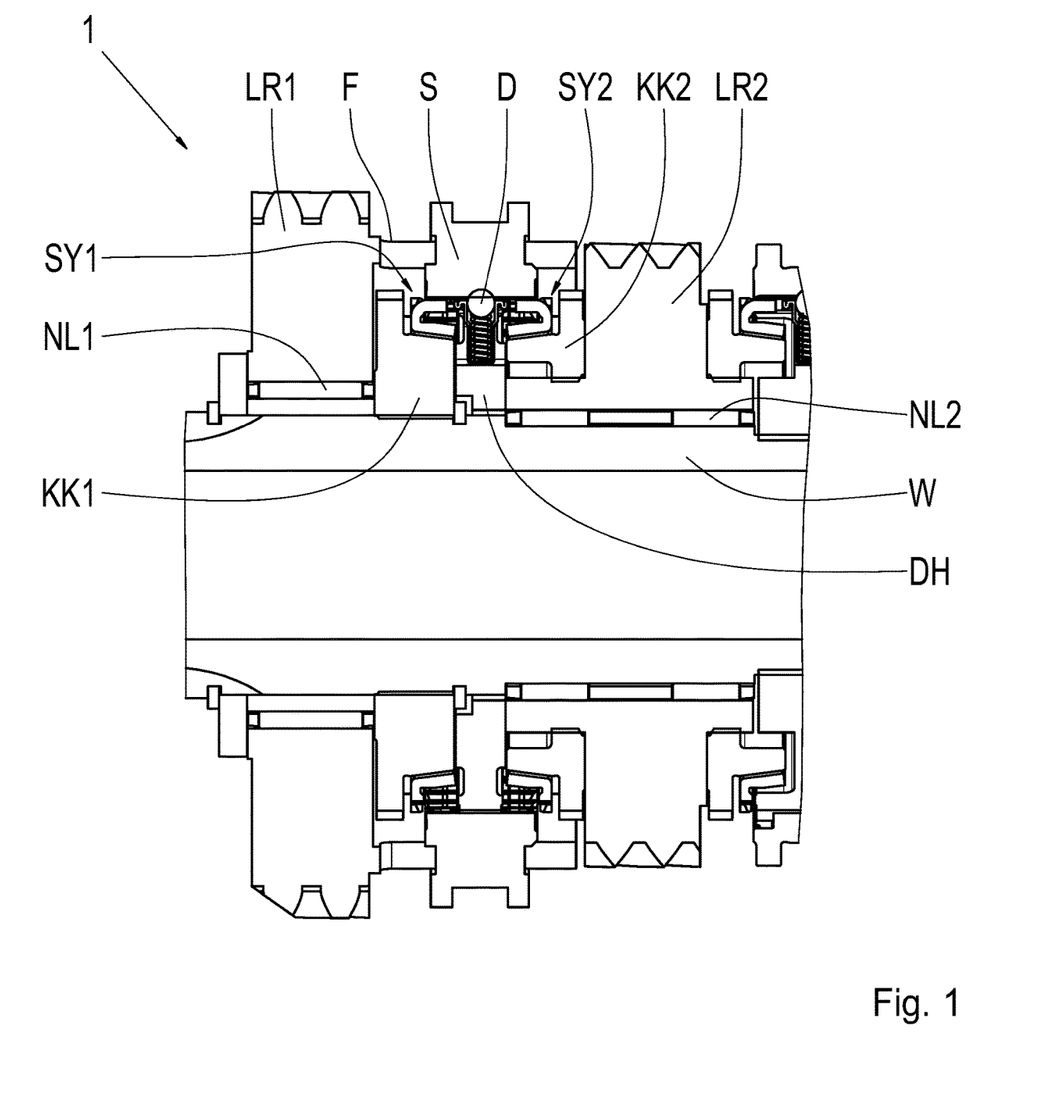
FIG. 1 shows a cutaway view of an engagement device according to the invention, including a synchronizer.

FIG. 1 shows a cutaway view of a first exemplary embodiment of an engagement device 1 according to the invention. The engagement device 1 is configured for establishing an engageable, rotationally fixed connection between a shaft W and a first idler gear LR1 which is rotatably mounted on the shaft W via a first needle bearing NL1. The engagement device 1 is further configured for establishing an engageable, rotationally fixed connection between the first idler gear LR1 and a second idler gear LR2 which is arranged coaxially to the shaft W and is rotatably mounted on the shaft W via a second needle bearing NL2. The second needle bearing NL2 is a double-row bearing, for example.

A gear shift sleeve S is arranged between the first and the second idler gears LR1, LR2. The gear shift sleeve S includes a circumferential groove on its outer circumference, into which an actuator (not represented) is engagable in a form-fit manner, for example, a gear shift fork. The embodiment of the form-fit interface between the gear shift fork and the gear shift sleeve S represented in FIG. 1 is to be considered merely as an example. If the gear shift sleeve S is axially displaced by the actuator in the direction of the first idler gear LR1, the rotationally fixed connection between the shaft W and the first idler gear LR1 is established. For this purpose, a synchronizer hub KK1 is rotationally fixed to the shaft W. The synchronizer hub KK1 has a bevel which interacts with a synchronizing mechanism SY1. The synchronizing mechanism SY1 is configured, in a known way, for allowing the establishment of the rotationally fixed connection between the shaft W and the first idler gear LR1 only when the shaft W and the first idler gear LR1 have the same rotational speed.

The gear shift sleeve S is connected to the first idler gear LR1 in a form-fit manner by axially projecting extensions F being formed on the first idler gear LR1. The extensions F engage into recesses A of the gear shift sleeve S, which are not visible in the cutaway view represented. If the gear shift sleeve S is now displaced in the direction of the second idler gear LR2, the rotationally fixed connection between the two idler gears LR1, LR2 is established. This rotationally fixed connection is established via the extensions F, the gear shift sleeve S connected to the extensions F, and via a synchronizer hub KK2. The synchronizer hub KK2 is rotationally fixed to the second idler gear LR2 and includes a bevel which interacts with a synchronizing mechanism SY2. The synchronizing mechanism SY2 is configured, in a known way, for allowing the establishment of the rotationally fixed connection between the gear shift sleeve S and the synchronizer hub KK2 only when the two idler gears LR1, LR2 have the same rotational speed.

In a central position of the gear shift sleeve S, the first idler gear LR1 is rotationally fixed neither to the shaft W nor to the second idler gear LR2. This central position of the gear shift sleeve S corresponds to a neutral position of the engagement device 1. Other versions are also conceivable, in which the neutral position does not correspond to a central position of the gear shift sleeve, but rather to a position offset from the center. For example, in the central position, the first idler gear could be coupled to the shaft. Upon displacement of the gear shift sleeve in a first direction, the neutral position of the engagement device could be present. Upon displacement in a second direction, which is opposite the first direction, the coupling of the two idler gears could take place. These types of versions are not represented in the figures, for the sake of clarity.

The engagement device 1 includes a pressure piece holder DH which is rotationally fixed to the shaft W via a tooth system. The pressure piece holder DH is configured, on its outer circumference, for supporting a spring-loaded pressure piece D. Through the pressure piece D, the gear shift sleeve S is lockable at least in its central position.

Figure 2:
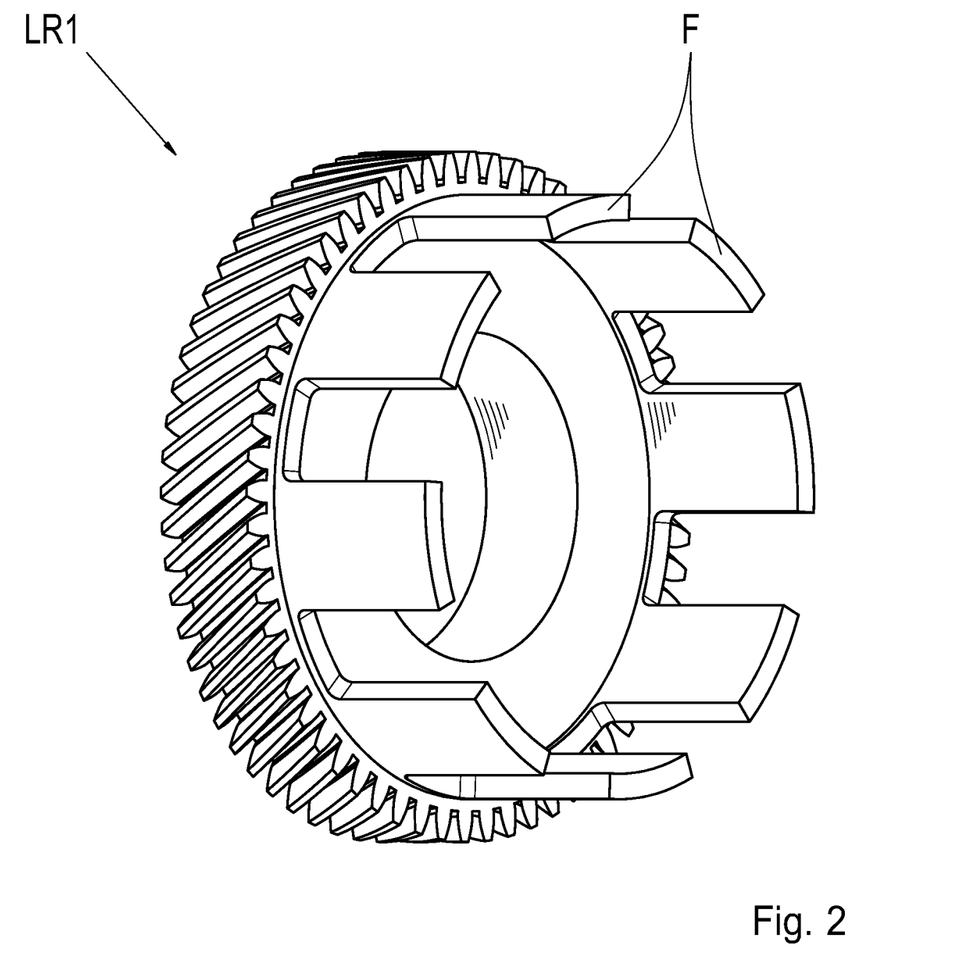
FIG. 2 shows an isometric view of an idler gear of the engagement device.

FIG. 2 shows an isometric view of the first idler gear LR1 of the engagement device 1 according to FIG. 1. As is clearly apparent in FIG. 2, the extensions F are formed by ring segments projecting from the first idler gear LR1. The extensions F and the idler gear LR1 form a one-part design.

Figure 3:
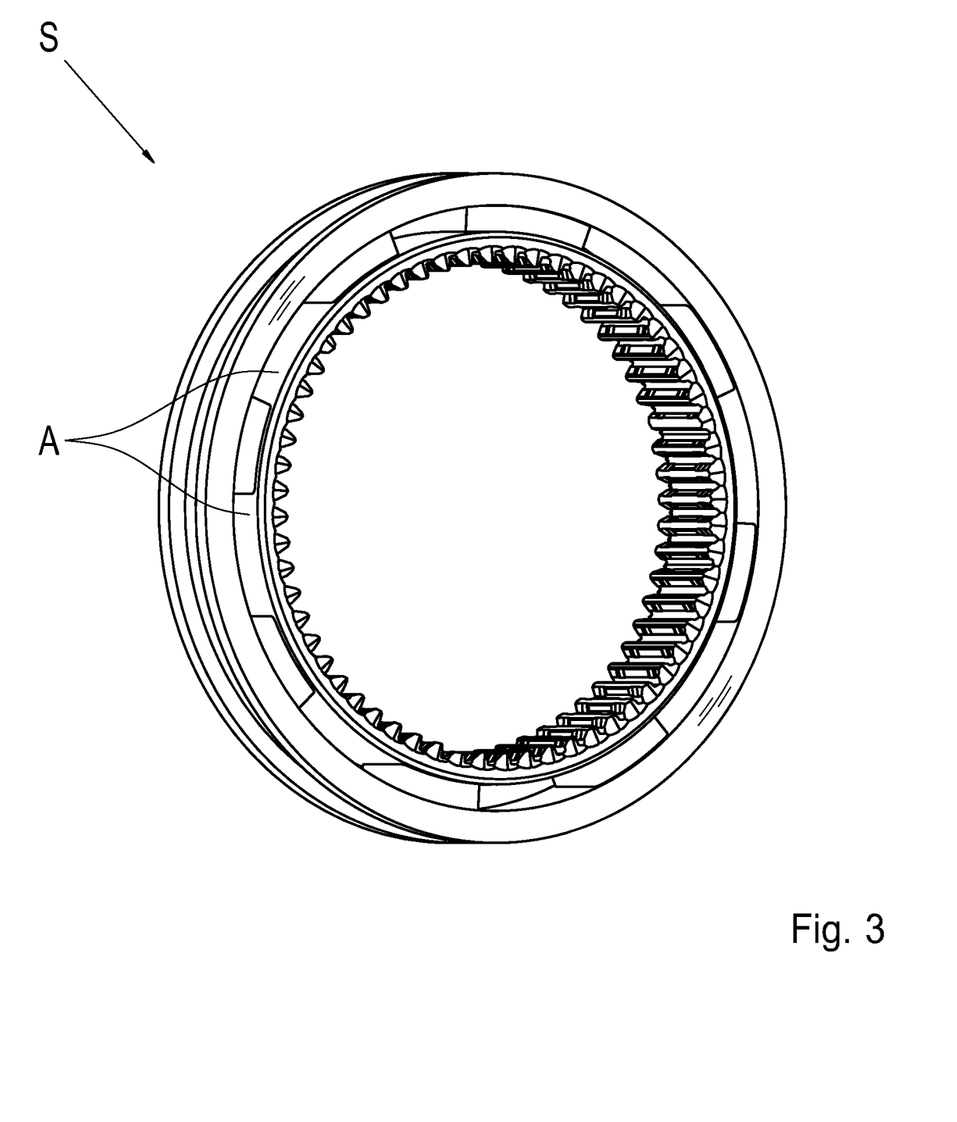
FIG. 3 shows an isometric view of a gear shift sleeve of the engagement device.

FIG. 3 shows an isometric view of the gear shift sleeve S of the engagement device 1 according to FIG. 1. Clearly apparent in FIG. 3 are openings A formed in the gear shift sleeve S, which are through holes in the present design. The openings A are proportioned in such a way that an axial displacement of the gear shift sleeve S relative to the first idler gear LR1 is possible, axially guided by the extensions F.

Figure 4:
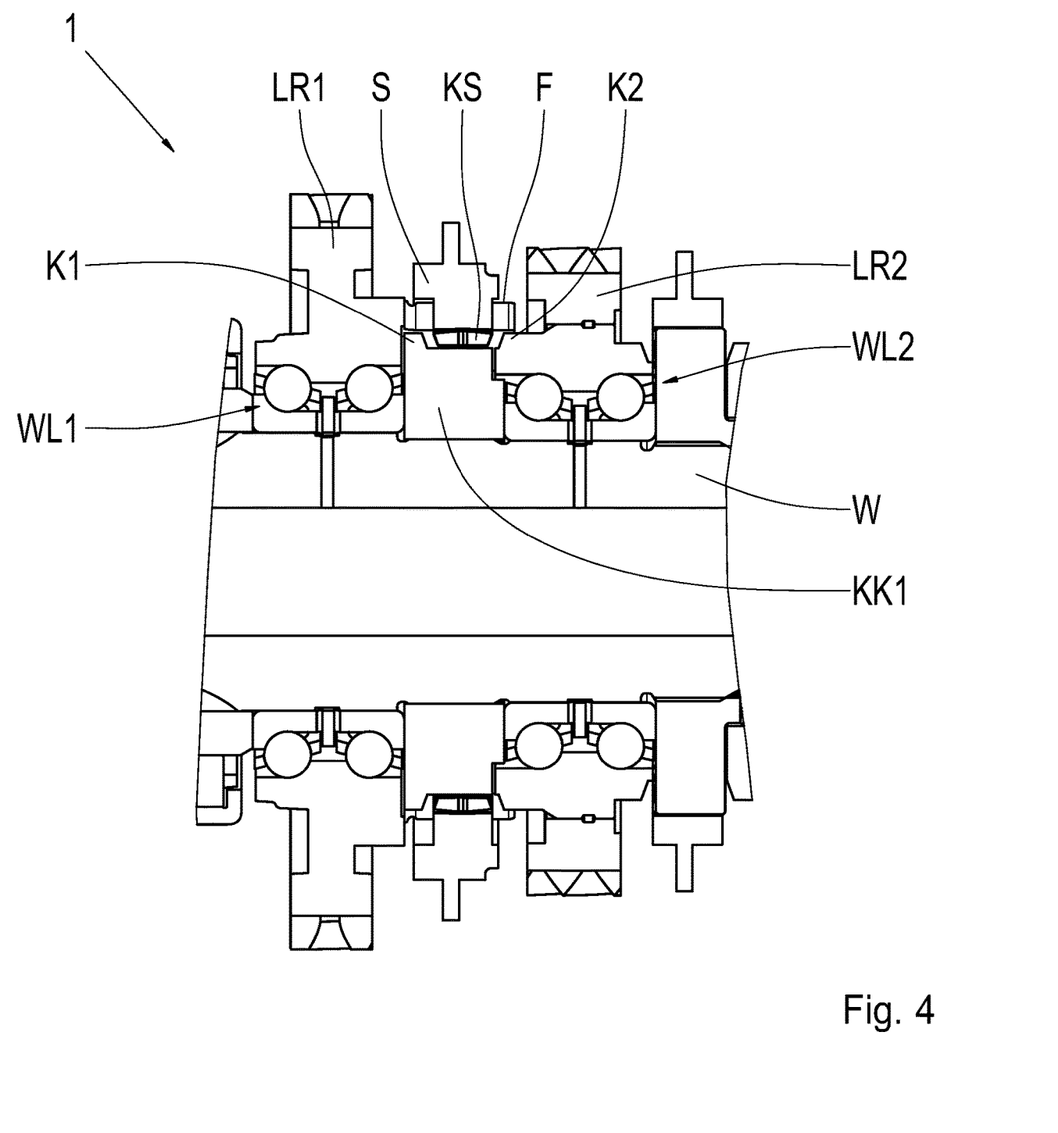
FIG. 4 shows a cutaway view of an engagement device according to the invention, without a synchronizer.

FIG. 4 shows a cutaway view of a second exemplary embodiment of the engagement device 1 according to the invention. In contrast to the exemplary embodiment according to FIG. 1, a synchronizing mechanism is not provided in this case. A dog toothing K1 is formed on the outer circumference of the synchronizer hub KK1 which is rotationally fixed to the shaft W. Formed on the inner diameter of the gear shift sleeve S is a dog toothing KS which is complementary thereto. If the gear shift sleeve S is displaced by an actuator (not represented) in the direction of the first idler gear LR1, a form-fit, rotationally fixed connection between the synchronizer hub KK1 and the first idler gear LR1 is established via the dog toothings K1 and KS. Since the synchronizer hub KK1 is rotationally fixed to the shaft W, and the gear shift sleeve S is connected to the first idler gear LR1 via the extensions F, a rotationally fixed connection between the first idler gear LR1 and the shaft W is therefore established.

Formed on the second idler gear LR2 is a dog toothing K2 which is complementary to the dog toothing KS of the gear shift sleeve S. If the gear shift sleeve S, originating from its neutral position, is displaced in the direction of the second idler gear LR2, a form-fit, rotationally fixed connection between the gear shift sleeve S and the second idler gear LR2 is established via the dog toothings KS and K2. Since the gear shift sleeve S is connected to the first idler gear LR1 via the extensions F, a rotationally fixed connection is therefore established between the two idler gears LR1, LR2. In this position, the dog toothing K1 is not engaged with the dog toothing KS.

Figure 5:
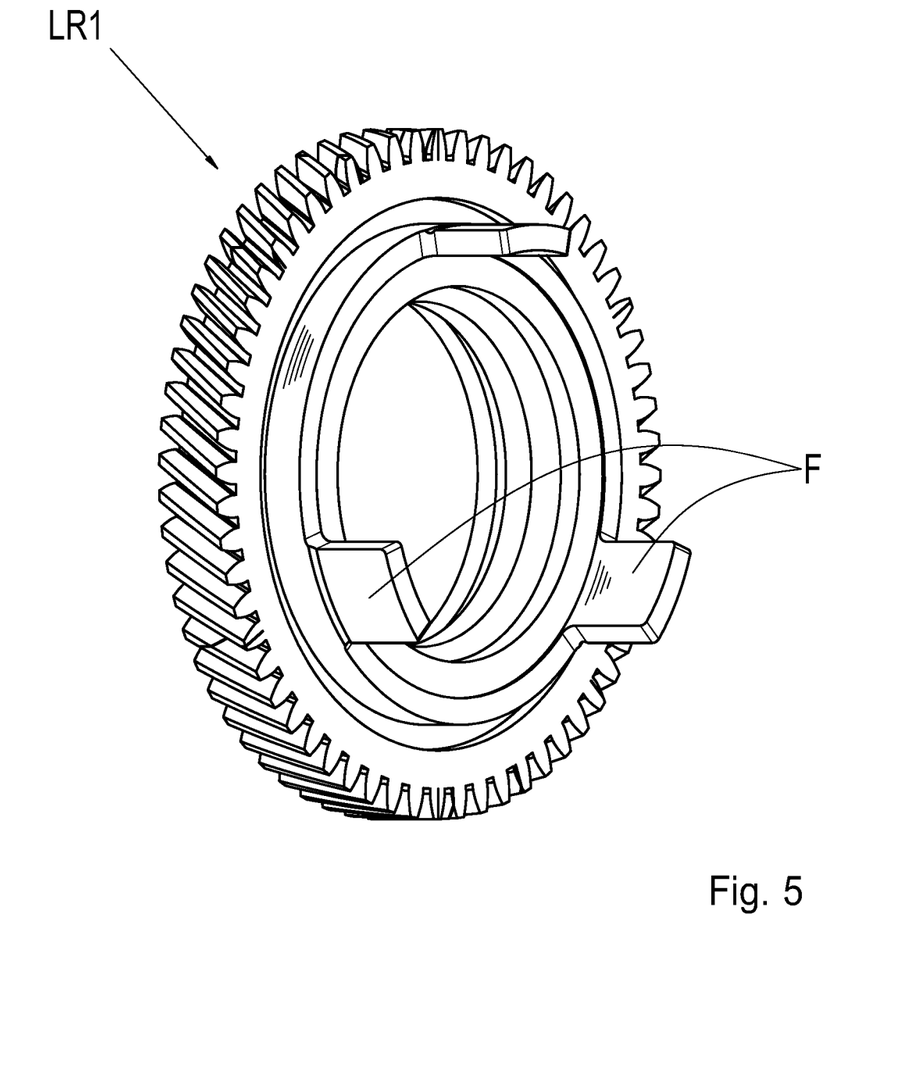
FIG. 5 shows an isometric view of an idler gear of the engagement device without a synchronizer.

FIG. 5 shows an isometric view of the first idler gear LR1 of the engagement device 1 according to FIG. 4. As is clearly apparent in FIG. 5, the extensions F are formed by three ring segments projecting from the first idler gear LR1. The extensions F and the idler gear LR1 form a one-part design.

Figure 6:
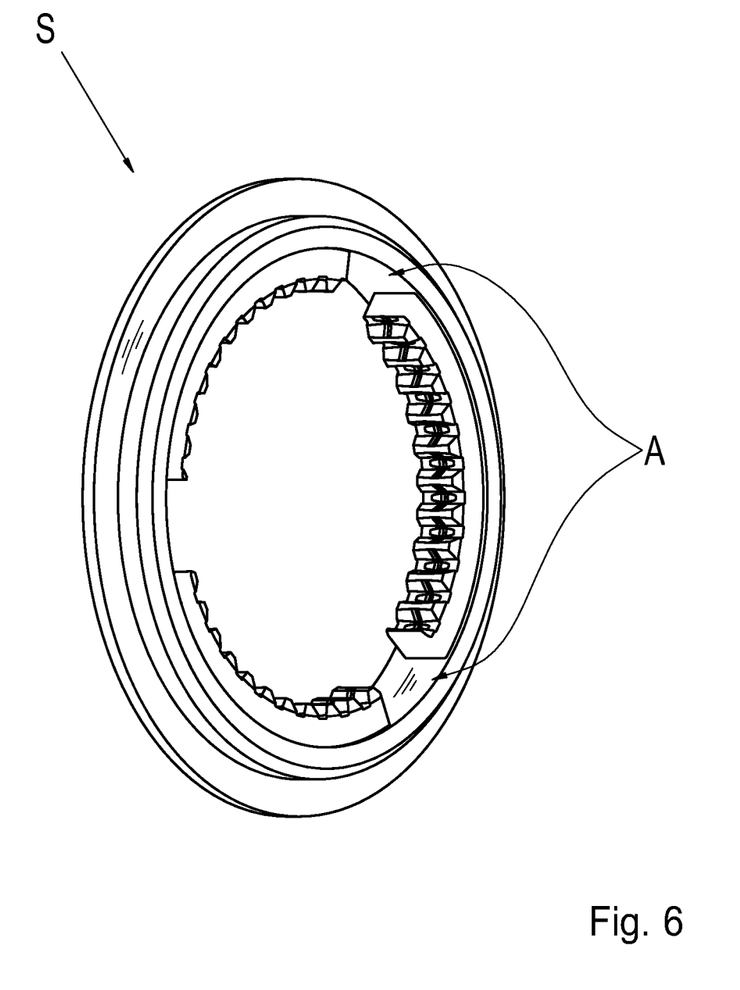
FIG. 6 shows an isometric view of a gear shift sleeve of the engagement device without a synchronizer.

FIG. 6 shows an isometric view of the gear shift sleeve S of the engagement device 1 according to FIG. 4. Clearly apparent in FIG. 6 are openings A formed in the gear shift sleeve S, which are open areas in the driving toothing of the gear shift sleeve S in the present design. The openings A are proportioned such that an axial displacement of the gear shift sleeve S relative to the first idler gear LR1 is possible, axially guided by the extensions F.

Figure 7:
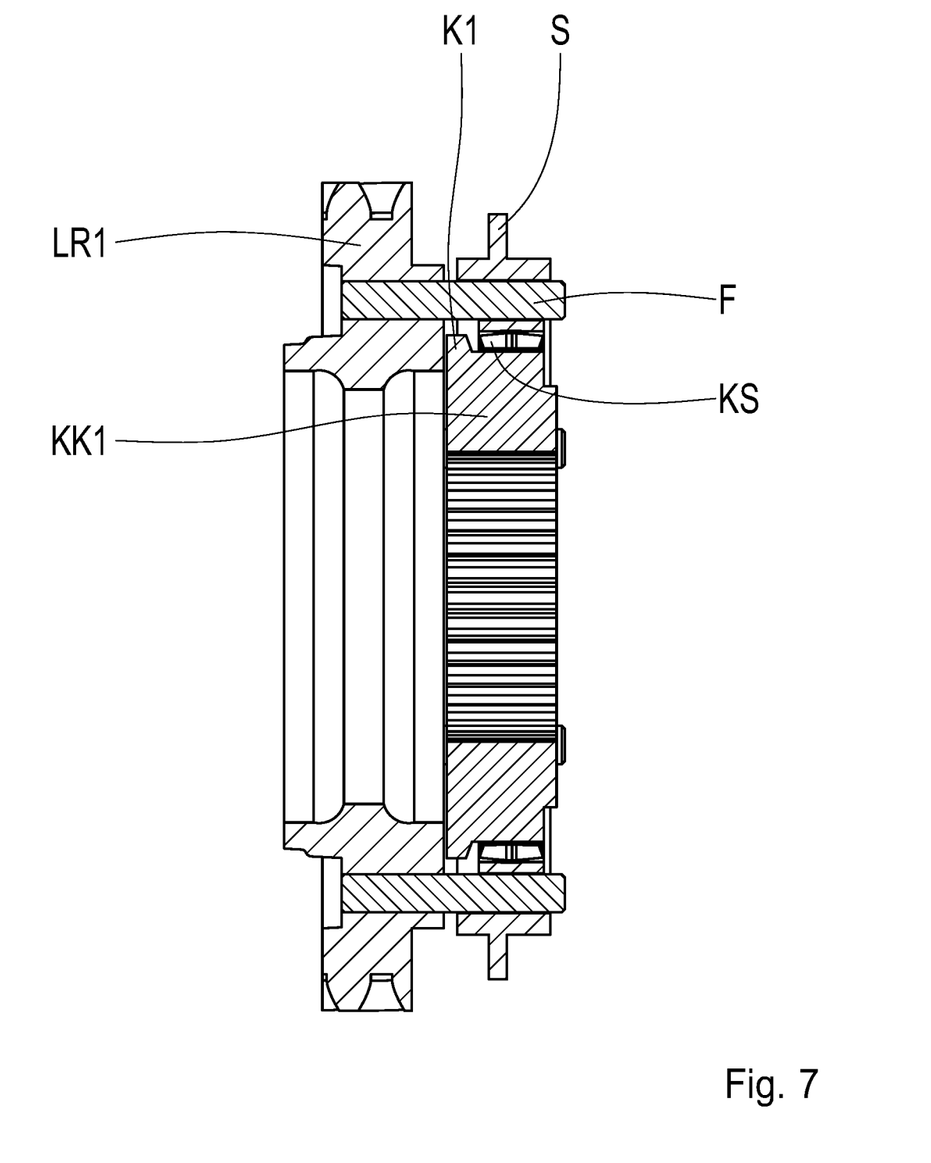
FIG. 7 shows a cutaway view of one part of the engagement device according to the invention, without a synchronizer.

FIG. 7 shows a cutaway view according to one variant of the design represented in FIG. 6. The extensions F are, in this case, cylindrical pins having a circular cross-section, which are connected to the first idler gear LR1 by a press-fit connection. Alternatively thereto, the extensions F are weldable to the first idler gear LR1. The corresponding weld could be arranged in the recess on that face end of the first idler gear LR1 which is positioned opposite the synchronizer hub KK1.

Figure 8:
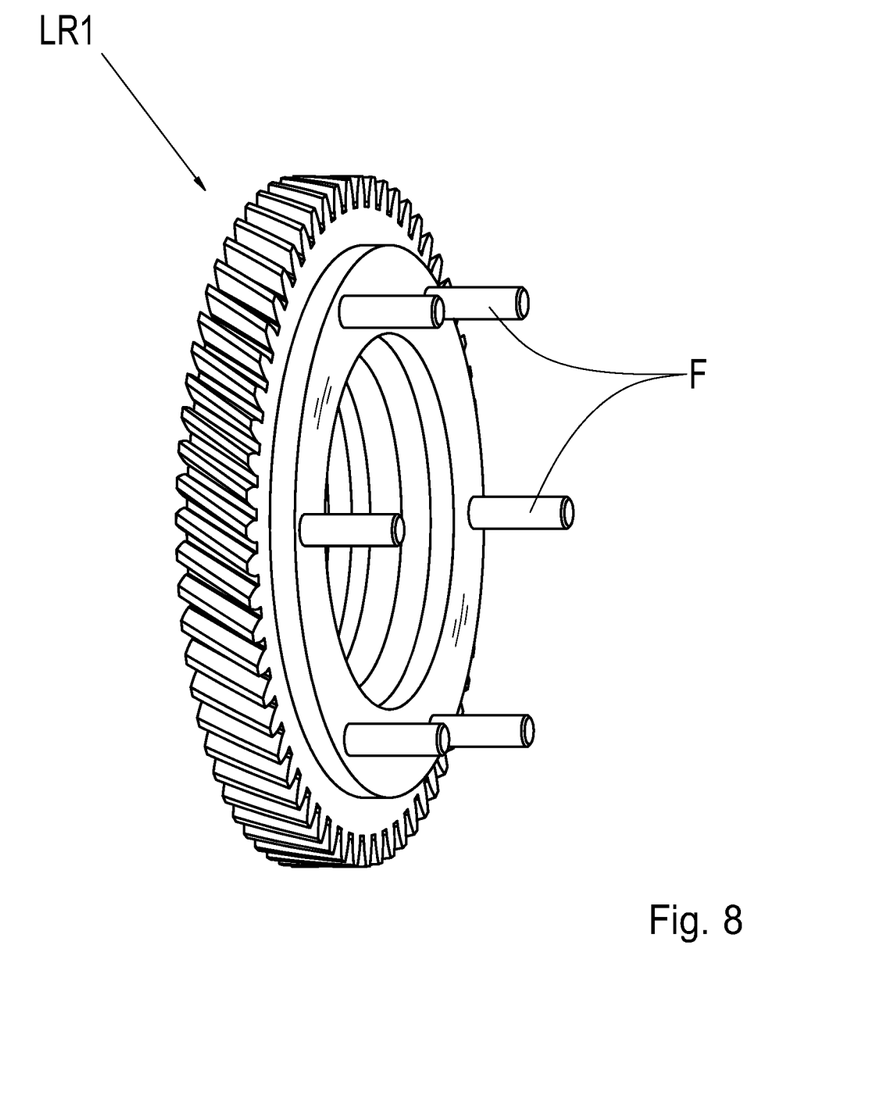
FIG. 8 shows an isometric view of an idler gear according to FIG. 7.

FIG. 8 shows an isometric view of the first idler gear LR1 according to the design represented in FIG. 7. It is clearly apparent in FIG. 8 that the extensions F are formed by six pins which have a circular cross-section and project from the first idler gear LR1.

Figure 9:
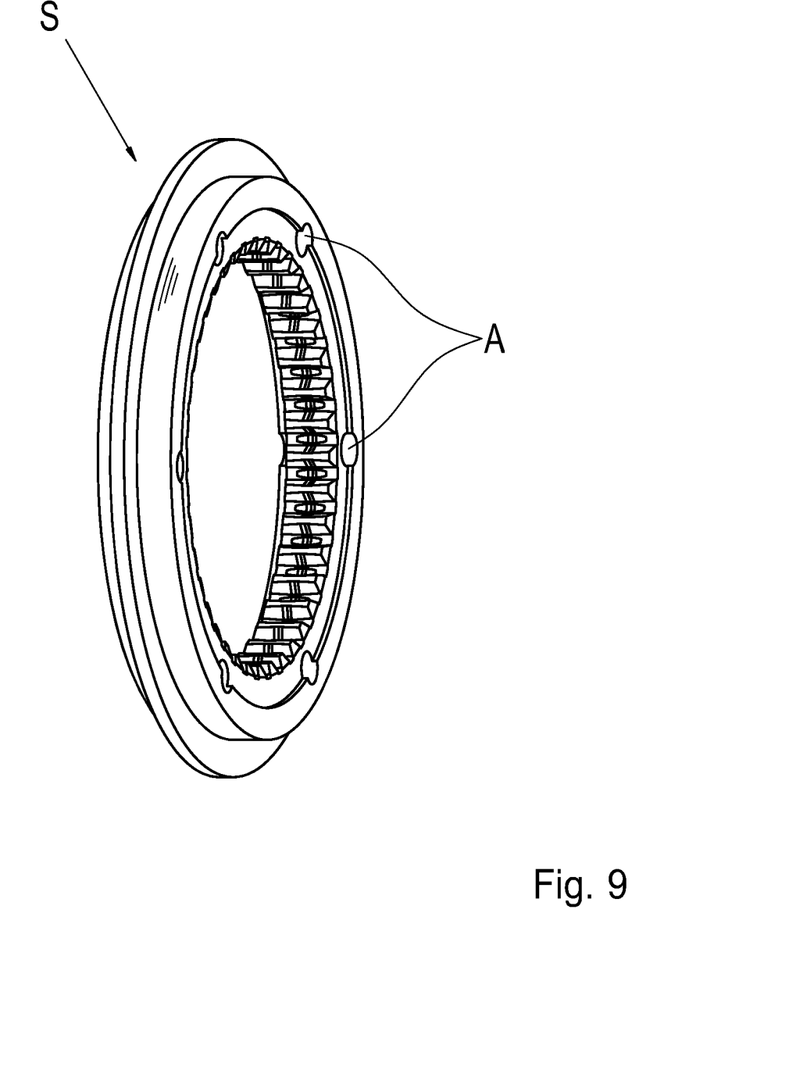
FIG. 9 shows an isometric view of a gear shift sleeve according to FIG. 7.

FIG. 9 shows an isometric view of the gear shift sleeve S according to the design represented in FIG. 7. Clearly apparent in FIG. 9 are the openings A formed in the gear shift sleeve S, which are bore holes in the present design. The openings A are proportioned in such a way that an axial displacement of the gear shift sleeve S relative to the first idler gear LR1 is possible, axially guided by the extensions F.

Figure 10:
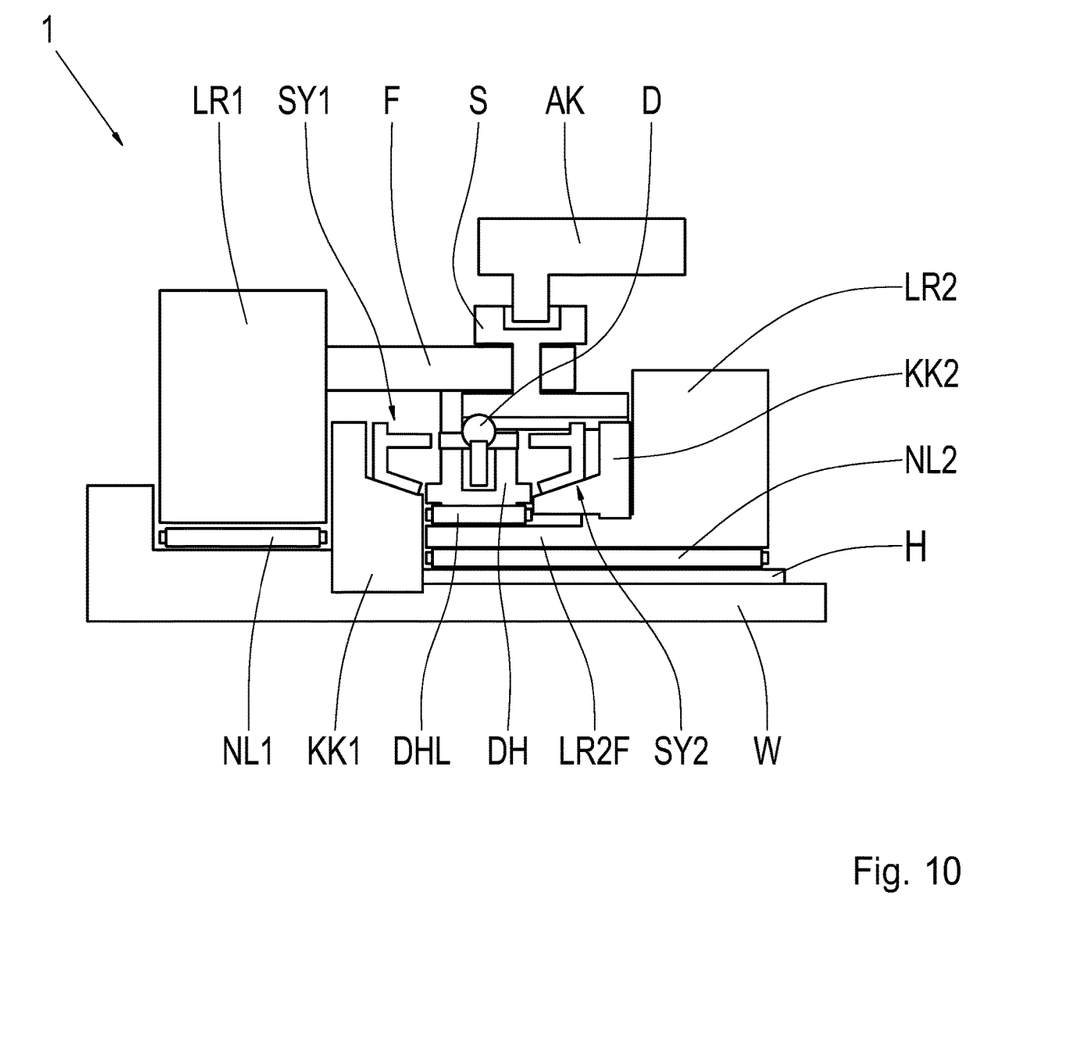
FIGS. 10 to 12 each show a schematic diagram of various mountings of a pressure piece holder of the engagement device according to the invention.

FIG. 10 shows a schematic diagram of a third exemplary embodiment of the engagement device 1 including synchronizing mechanisms SY1, SY2. In contrast to the first exemplary embodiment represented in FIG. 1, the engagement device 1 includes an optional sleeve H which is arranged between the shaft W and the second needle bearing NL2. The second idler gear LR2 includes an extension LR2F projecting axially in the direction of the first idler gear LR1. The synchronizer hub KK2 is rotationally fixed to the idler gear LR2 via the extension LR2F. In addition, the extension LR2F is utilized for mounting the pressure piece holder DH which is rotatably mounted and centered on the extension LR2F via a needle bearing DHL.

Figure 11:
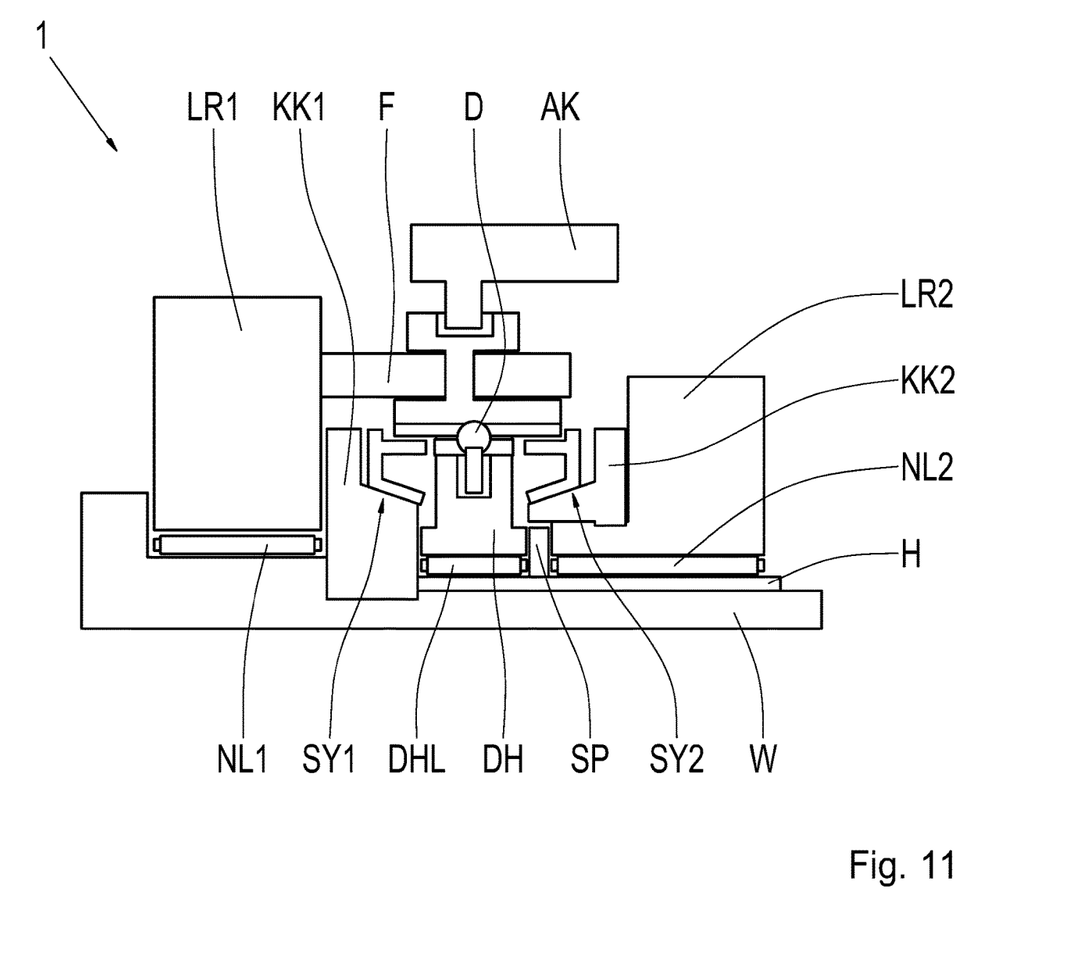

FIG. 11 shows a schematic diagram of a fourth exemplary embodiment of the engagement device 1 including synchronizing mechanisms SY1, SY2. In contrast to the third exemplary embodiment represented in FIG. 10, the pressure piece holder DH is not rotatably mounted on the second idler gear LR2, but rather on the shaft W. The corresponding needle bearing DHL is supported on the sleeve H. The sleeve H is only optionally provided. The pressure piece holder DH and the second idler gear LR2 are axially separated from each other by a spacer SP. The spacer SP can be, for example, a thrust washer.

Figure 12:
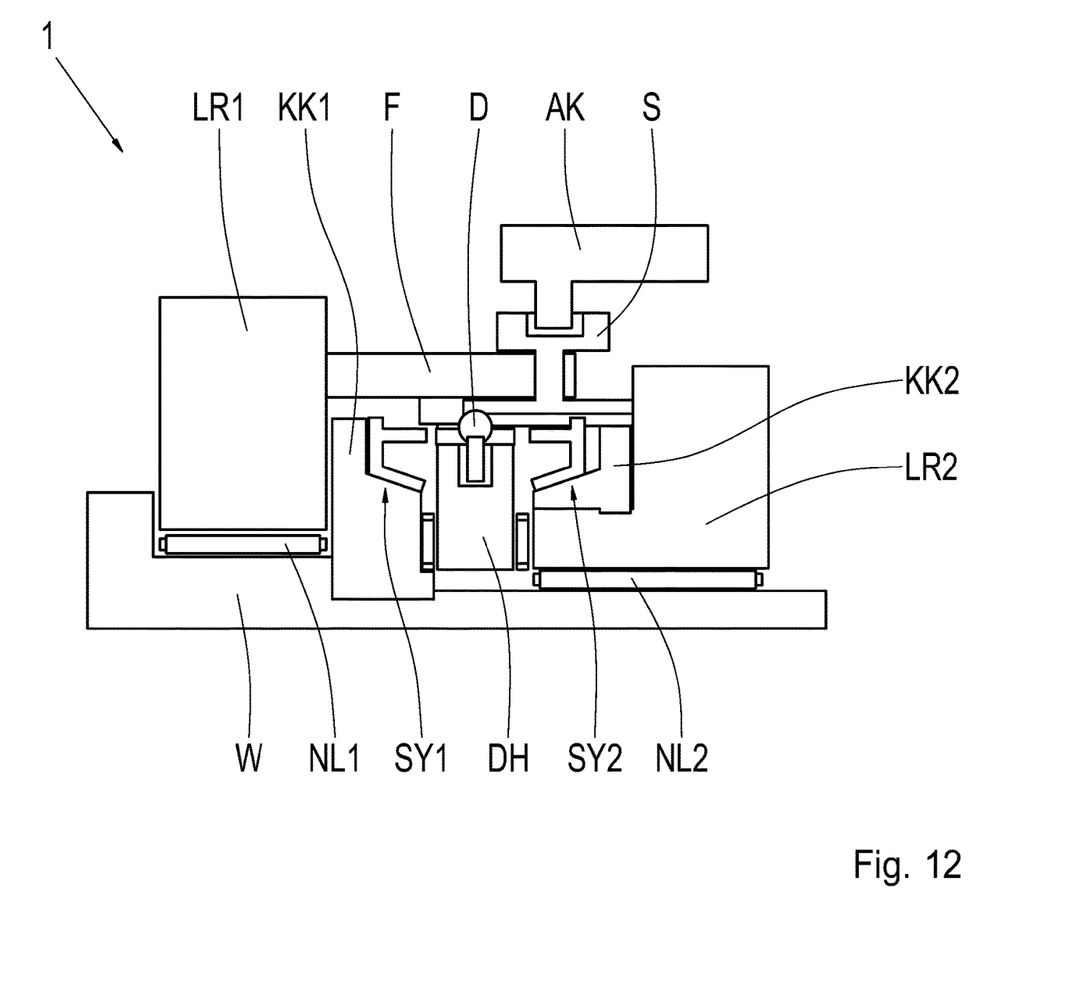

FIG. 12 shows a schematic diagram of a fifth exemplary embodiment of the engagement device 1 including synchronizing mechanisms SY1, SY2. In contrast to the third exemplary embodiment represented in FIG. 10, the pressure piece holder DH is centered, on its outer circumference, on an inner side of the extensions F of the first idler gear LR1. In this case, the pressure piece holder DH is rotationally fixed to the extensions F.

Figure 13:
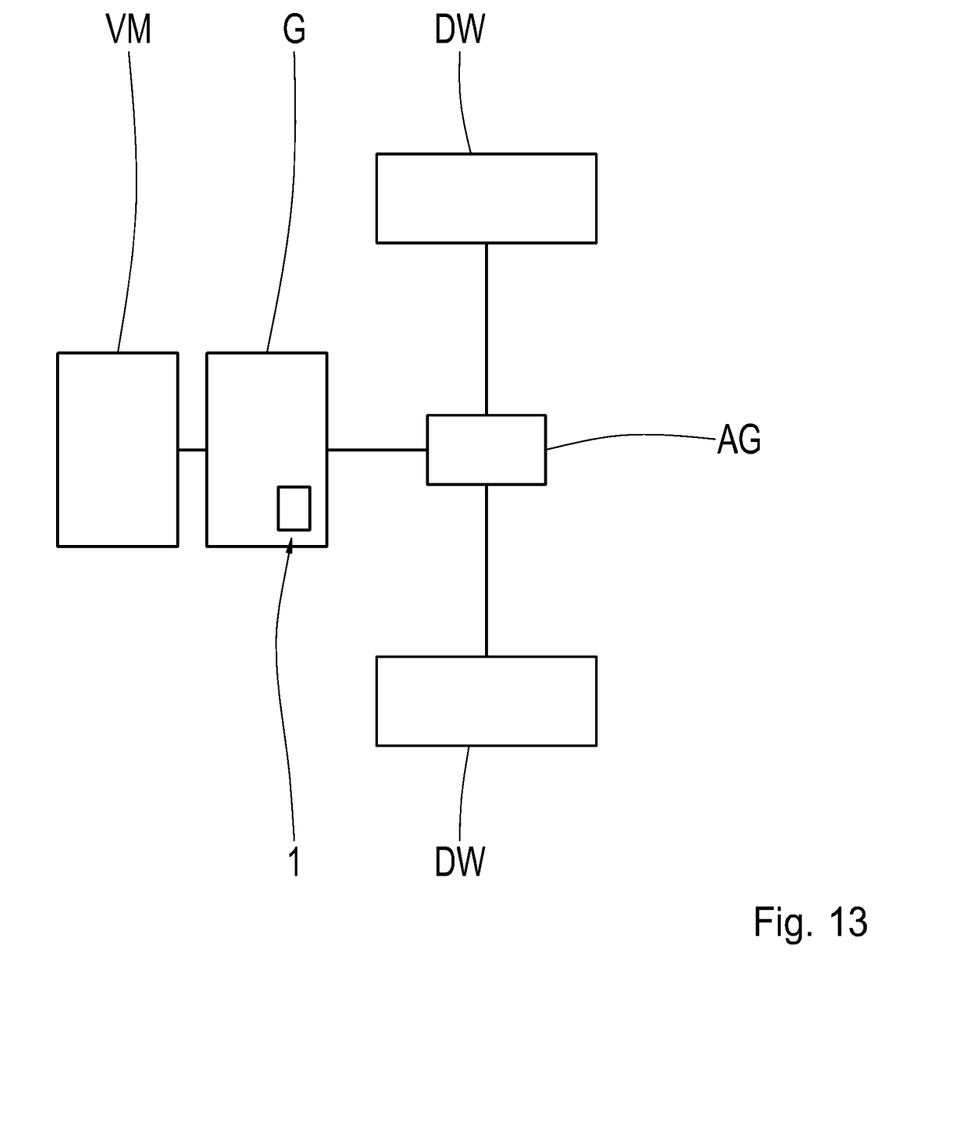
FIG. 13 schematically shows a drive train of a motor vehicle.

FIG. 13 schematically shows a drive train of a motor vehicle. The drive train includes an internal combustion engine VM, to which a transmission G is connected. The transmission G is preferably a multi-stage transmission, in which a multitude of gears, i.e., fixed translation ratios between an input shaft and an output shaft of the transmission G are preferably automatically shiftable. Through such a transmission G, the speed and torque output characteristics of the internal combustion engine VM are adaptable, in a suitable way, to the tractional resistances of the vehicle. The transmission G is connected on the output side to a differential gear AG, via which the power present on the output side of the transmission G is distributable to driving wheels DW of the motor vehicle.

The transmission G includes an engagement device 1 according to one of the above-described exemplary embodiments, wherein the engagement device 1 is preferably configured for establishing two gears of the transmission G. The transmission G can be, for example, an automatic transmission, for example, a dual clutch transmission. Alternatively thereto, the transmission G can be a manually shifted transmission.

The engagement device 1 could also be utilized for coupling a shaft of a first transmission to a shaft of a second transmission. The first and the second transmissions can be sub-transmissions of an overall transmission. For example, the engagement device could be utilized for coupling a front-mounted or rear-mounted gear set to a main transmission. These types of group transmissions are utilized, for example, in commercial vehicles.

The design of the drive train represented in FIG. 13 is to be considered merely as an example. Instead of the represented design including a drive train aligned longitudinally with respect to the direction of travel of the motor vehicle, a use in a drive train aligned transversely to the direction of travel is also conceivable. The differential gear AG can be integrated into the transmission G.

Modifications and variations can be made to the embodiments illustrated or described herein without departing from the scope and spirit of the invention as set forth in the appended claims.

REFERENCE CHARACTERS 1 shift device
G transmission
W shaft
LR1 first idler gear
F extensions
NL1 first needle bearing
LR2 second idler gear
NL2 second needle bearing
LR2F extension
S gear shift sleeve
A openings
SY1, SY2 synchronizing mechanism
K1, K2, KS dog toothing
KK1, KK2 synchronizer hub
DH pressure piece holder
D pressure piece
DHL needle bearing
H sleeve
SP spacer
AK actuator VM internal combustion engine
AG differential gear
DW driving wheel

The invention claimed is:

1. An engagement device (1) for a transmission (G), the engagement device (1) comprising:
   a gear shift sleeve (S) arranged between a first idler gear (LR1) associated with a shaft (W) of the transmission (G) and a second idler gear (LR2) arranged coaxially to the shaft (W),
   wherein, by displacing the gear shift sleeve (S) towards the first idler gear (LR1), a rotationally fixed connection between the shaft (W) and the first idler gear (LR1) is establishable,
   wherein, by displacing the gear shift sleeve (S) towards the second idler gear (LR2), a rotationally fixed connection between the first idler gear (LR1) and the second idler gear (LR2) is establishable, and
   wherein the first idler gear (LR1) comprises a plurality of axially projecting extensions (F) which extend through openings (A) formed in the gear shift sleeve (S).

2. The engagement device (1) of claim 1, wherein each of the openings (A) is a through hole or an open area.

3. The engagement device (1) of claim 1, wherein each of the plurality of axially projecting extensions (F) has a circular cross-section.

4. The engagement device (1) of claim 1, wherein each of the plurality of axially projecting extensions (F) is a ring segment projecting from the first idler gear (LR1).

5. The engagement device (1) of claim 1, wherein the plurality of axially projecting extensions (F) and the first idler gear (LR1) are one piece.

6. The engagement device (1) of claim 1, wherein the plurality of axially projecting extensions (F) are connected to the first idler gear (LR1) via a press-fit connection or a welded joint.

7. The engagement device (1) of claim 1, wherein the engagement device (1) has a neutral position, in which a rotationally fixed connection exists neither between the shaft (W) and the first idler gear (LR1) nor between the first and second idler gears (LR1, LR2).

8. The engagement device (1) of claim 1, further comprising a synchronizing mechanism (SY1, SY2) associated with at least one of the first and second idler gears (LR1, LR2).

9. The engagement device (1) of claim 1, wherein at least one of the rotationally fixed connection between the shaft (W) and the first idler gear (LR1) and the rotationally fixed connection between the first idler gear (LR1) and the second idler gear (LR2) is established via a dog toothing (K1, K2, KS).

10. The engagement device (1) of claim 1, further comprising a pressure piece holder (DH) configured for supporting a spring-loaded pressure piece (D), by which the gear shift sleeve (S) is lockable in at least one axial position.

11. The engagement device (1) of claim 10, wherein the pressure piece holder (DH) is centered on an inner side of the plurality of axially projecting extensions (F).

12. The engagement device (1) of claim 11, wherein the pressure piece holder (DH) is rotationally fixed to the gear shift sleeve (S).

13. The engagement device (1) of claim 10, wherein the pressure piece holder (DH) is radially centered on the first idler gear (LR1) or the second idler gear (LR2).

14. The engagement device (1) of claim 10, wherein the pressure piece holder (DH) is centered on the shaft (W).

15. A transmission (G) for a motor vehicle, comprising the engagement device (S) of claim 1.

16. The engagement device (1) of claim 1, wherein the plurality of axially projecting extensions (F) are axially fixed relative to the first idler gear (LR1).

* * * * *